United States Patent Office 3,035,051
Patented May 15, 1962

3,035,051
2α-CYANO OR 2-HYDROXYMETHYLENE-3-KETO STEROIDS
Henry M. Kissman and Arlene M. Hoffman, Nanuet, N.Y., and Martin J. Weiss, Oradell, N.J., assignors to American Cyanamid Company, New York, N.Y., a corporation of Maine
No Drawing. Filed Sept. 12, 1960, Ser. No. 55,134
19 Claims. (Cl. 260—239.55)

This invention relates to new steroid compounds. More particularly, it relates to 2α-cyano steroids of the pregnane and androstane series and to 2-hydroxymethylene steroids which are intermediates for the final products and methods of preparing the same.

The novel 2α-cyano Δ⁴-3-keto steroids of the present invention can be illustrated by the following general formula:

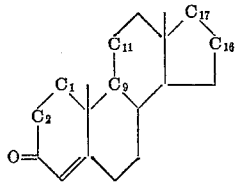

in which —$C_1$—$C_2$— is a divalent radical selected from the group consisting of:

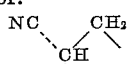

and

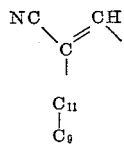

is a trivalent radical of the group consisting of:

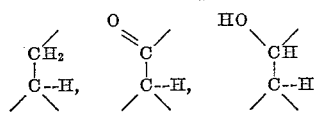

and

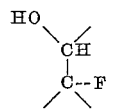

and

is a divalent radical of the group consisting of:

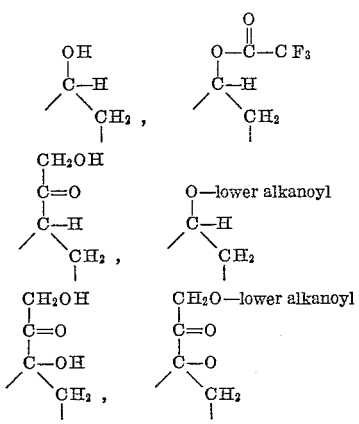

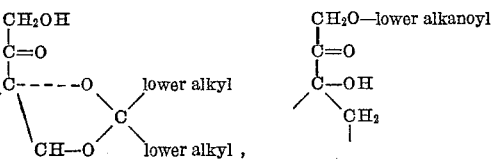

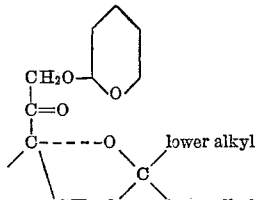

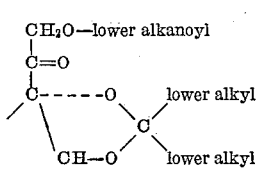

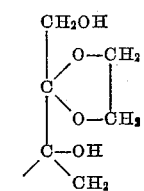

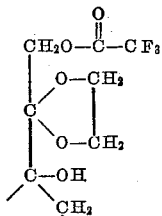

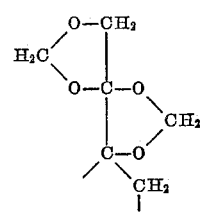

and

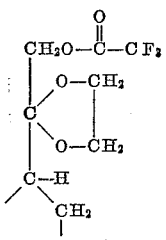

radicals.

The 2α-cyano Δ⁴-3-keto steroids of this invention are prepared by a novel method which comprises treating the corresponding hydroxymethylene steroid with O,N-bis-trifluoroacetylhydroxylamine, usually in approximately equivalent amounts, in an inert solvent such as benzene containing an equivalent of a tertiary amine base such as pyridine at a temperature ranging from 20° C. to 120° C., usually from about 60° C. to 90° C. for a period of time ranging from 30 minutes to 24 hours, usually one or two hours.

Under the defined conditions, free 17β-hydroxyl and 21-hydroxyl, but not 11β-hydroxyl groups will undergo at least partial trifluoroacetylation. In these circumstances it is best to add an additional equivalent of O,N-bis-trifluoroacetylhydroxylamine to the reaction mixture for each vulnerable hydroxyl group present in the steroid molecule. The intermediate trifluoroacetylated derivatives can then be converted into the free steroids by mild alkaline or acid hydrolysis.

The products can be obtained by the usual work-up procedures—including washing, evaporation of solvent and recrystallization.

The 2α-cyano-Δ⁴-3-keto steroids of this invention are, in general, white crystalline solids having infrared absorption bands at about 4.5μ (C≡N) and 5.9μ

(Δ⁴-3-C=O)

and typical Δ⁴-3-ketone ultraviolet absorption at about 240 mμ (when determined in neutral medium). These compounds are soluble in aqueous alkali and can be regenerated therefrom by acidification.

The 2-cyano-Δ¹,⁴-3-keto steroids of this invention are prepared from the corresponding 2α-cyano-Δ⁴-3-keto steroids by treating the latter with a 1,2-dehydrogenating agent such as 2,3-dichloro-5,6-dicyanobenzoquinone.

The above reaction is usually carried out in an inert solvent such as dioxane at reflux temperature for a period of about 24 hours. The product is isolated by evaporation of solvent, addition of benzene (which does not dissolve the bulk of the 2,3-dichloro-5,6-dicyanohydroquinone formed in the reaction), and filtration, washing with aqueous alkali to remove what hydroquinone does dissolve, evaporation of the solvent benzene, and recrystallization of product from the residue.

The 2-cyano-Δ¹,⁴-3-keto steroids of this invention are, in general, white crystalline solids, relatively insoluble in water and soluble in lower alkyl alkanols, acetone, ethyl acetate and the like.

The process, described above, of reacting an hydroxymethylene steroid with O,N-bis-trifluoroacetylhydroxylamine proceeds under steric influences and steroisomers may be formed (i.e., either the 2α-cyano-Δ⁴-3-keto steroids or the 2β-cyano-Δ⁴-3-keto steroids may be formed).

As shown above, the predominant isomers are indicated as having the 2-cyano substituent in the alpha configuration. This alpha configuration has been designated in order to provide a definite exposition of the invention and to provide a definite basis for a specification constituting a useful contribution to the art.

At the same time it should be made clear that the alpha configuration so designated for the 2-cyano substituent is based upon theoretical considerations, on analyses of molecular rotation data and on interpretations of infrared and ultraviolet absorption data, in the light of present understandings of these phenomena according to recent and present chemical literature. Such designations of the alpha configuration for the cyano substituent, thus, are dependent upon the state of the art presently understood by organic chemists.

As a result of the immediately foregoing considerations, no part of the specification of the present application filed in consideration of the state of the art should be considered materially defective if in the future it should be established that the configuration of the 2-cyano substituent of the 2-cyano-Δ⁴-3-keto steroids of this invention is opposite to that now deducible.

It should be still further noted that the 2-cyano-Δ¹,⁴-3-keto steroids of this invention (see hereinabove) are not subject to the possible ambiguity of structure discussed immediately above, because the presence of the 1,2-double bond precludes stereoisomerism involving the 2-position.

The novel 2-hydroxymethylene-Δ⁴-3-keto steroids of this invention are, for example, 2-hydroxymethylene-4-pregnene-3,20-dione, 21-hydroxy-2-hydroxymethylene-4-pregnene-3,20-dione, 2-hydroxymethylene-17α,20;20,21-bismethylenedioxy-4-pregnene-3,11-dione, 9α-fluoro-11β-hydroxy-2-hydroxymethylene-16α,17α-isopropylidenedioxy-21-(tetrahydropyran-2-yloxy)-4-pregnene-3,20-dione and 9α-fluoro-11β,21-dihydroxy-2-hydroxymethylene-16α,17α-isopropylidenedioxy-4-pregnene-3,20-dione.

These compounds are prepared by treating the appropriate Δ⁴-3-keto steroid with a lower alkyl formate (e.g., ethyl formate) in the presence of an alkaline condensing agent, such as sodium hydride or a sodium alkoxide in a solvent inert to the reactants such as benzene at about room temperature for 10 to 72 hours, usually about 16 hours preferably under an atmosphere of nitrogen.

The products are isolated first by extraction into aqueous alkali, thus being separated from alkali-insoluble unreacted starting material. Acidification gives crude products which may be further purified by standard recrystallization techniques.

It is necessary that the compound submitted to the above-described formylation reaction have its side-chain suitably blocked so as to prevent C–21 formylation and/or in the instance of side-chains having hydroxy groups present at C–17 or C–21 base-catalyzed rearrangements. When the 2-hydroxymethylene-Δ⁴-3-ketone with the deblocked side-chain is desired, cleavage of the blocking groups can be achieved by the usual conditions of acid hydrolysis.

The 2-hydroxymethylene-Δ⁴-3-keto steroids of this invention are, in general, yellow crystalline solids having ultraviolet absorption maxima, when determined in neutral media, at about 248–252 mμ and about 305 mμ, the later maximum generally being of lesser intensity. In accordance with the usual conventions of the art, the 2-hydroxymethylene-Δ⁴-3-keto steroids of this invention are considered to be in the enol (i.e., hydroxymethylene) tautomeric form and they are herein so defined. It is understood that the specification will not be materially defective in case it should be shown later that these compounds exist, in whole or in part, in different tautomeric forms. The tautomeric forms can be as follows:

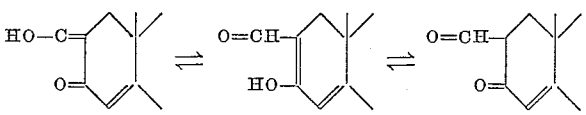

The compounds of the present invention have shown central nervous system depressant properties of the tranquilizer or muscle relaxant type. These compounds can be used as the active component in pharmaceutical preparations such as tablets, capsules, pills, powders etc. for the aleviation of anxiety.

In addition, the compounds 2α-cyano-9α-fluoro-11β,21-dihydroxy - 16α,17α - isopropylidenedioxy - 4 - pregnene- 3,20-dione, 9α-fluoro-11β-hydroxy-2-hydroxymethylene-16α,17α - isopropylidenedioxy - 21 - (tetrahydropyran-2-yloxy)-4-pregnene-3,20-dione and 9α-fluoro-11β-hydroxy-2 - hydroxymethylene - 16α,17α - isopropylidenedioxy-4-pregnene-3,20-dione have glucocorticoid activity when measured by the usual assays.

The hydroxymethylene derivatives and the blocked cyano derivatives of this invention are also useful chemical intermediates for the preparation of the deblocked 2-cyano compounds. Thus, the blocked 2-hydroxymethylene derivatives on treatment with O,N-bis-trifluoroacetylhydroxylamine gives the corresponding blocked nitriles, deblocking of which by hydrolytic procedures gives the free 20-ketones and/or 21-ols, or 17-ols.

An alternative hydrolytic deblocking of the 2-hydroxymethylene derivatives followed by treatment with O,N-bis-trifluoroacetylhydroxylamine gives the unblocked 2-cyano derivatives. In addition, both the blocked and deblocked cyano and hydroxymethylene derivatives may be converted into other useful steroids.

The following examples show in detail the preparation of representative 2α-cyano and 2-hydroxymethylene-Δ⁴-3-keto steroids of the present invention.

EXAMPLE I

O,N-Bis-(Trifluoroacetyl)-Hydroxylamine

A mixture of 6.95 g. (100 mmoles) of hydroxylamine hydrochloride and 50 cc. of trifluoroacetic anhydride is heated with stirring under reflux for one hour. All of the solid goes into solution during this period. The mixture is evaporated under reduced pressure and the oily residue is crystallized from a small amount of methylene chloride-pentane. The white crystalline solid is collected, washed with pentane and is dried under reduced pressure at room temperature over phosphorus pentoxide. There is obtained 14 g. of product (62%) with melting point 59–60° C. (sublimes).

EXAMPLE II

20-Ethylenedioxy-2-Hydroxymethylene-4-Pregnen-3-One

A mixture of progesterone 20-ethylene ketal [M. Gut, J. Org. Chem., 21, 1327 (1956)] (7.16 g., 20 mmoles), 3.4 g. of sodium hydride-oil dispersion, 6 cc. of ethyl formate and 130 cc. of dry benzene is stirred under nitrogen. The reaction is started by the addition of a few drops of absolute ethanol and stirring is continued for 18 hours. Benzene (150 cc.) is added to the dark brown suspension and then a few drops of ethanol to destroy excess sodium hydride. The mixture is extracted three times with water and then with several portions of cold 1% aqueous potassium hydroxide solution until the extracts no longer give a positive enol test. The combined extracts are neutralized through the addition of 30% aqueous sodium dihydrogen phosphate solution and the mixture is extracted with several portions of chloroform. The combined chloroform solutions are washed with a little water, dried and evaporated. The residue is crystallized with ether to give 2.8 g. (36%) of a yellow solid with melting point 145–152° C. A sample of this compound obtained in a similar experiment is recrystallized twice from ether; melting point 160–164° C.; $[\alpha]_D^{25}+42.4°$, (c., 1.03 in CHCl₃);

$\lambda_{max.}^{KBr}$ 6.06μ (s.) broad band, 6.32μ (m.); $\lambda_{max.}^{MeOH}$ 252 mμ (ε 14,900) and 305 mμ (ε 4050) in acid, 249 mμ (ε 13,550) and 305 mμ (ε 5030) in methanol, 245 mμ (ε 15,670) and 356 mμ (ε 12,220) in base.

EXAMPLE III

2-Hydroxymethylene-4-Pregnene-3,20-Dione

To a solution of 2-hydroxymethyleneprogesterone 20-ethylene ketal (2 g., 5.18 mmole) in 250 cc. of acetone is added 500 mg. of p-toluenesulfonic acid and the mixture is stirred at room temperature for 24 hours and is then neutralized with a few drops of pyridine. The solvent is removed under reduced pressure and the residue is dissolved in methylene chloride, washed with water, dried over magnesium sulfate, filtered and evaporated. The residue is crystallized from methylene chloride-ether to give 1.15 g. (65%) with melting point 165–170°. Recrystallization from the same solvent pair gives a sample with melting point 167–172°.

EXAMPLE IV

2 - Hydroxymethylenedeoxycorticosterone 20 - Ethylene Ketal (20 - Ethylenedioxy - 21 - Hydroxy - 2-Hydroxymethylene-4-Pregnen-3-One Deoxycorticosterone acetate 20-ethylene ketal [F. Sondheimer, et al. Tetrahedron 5, 15 (1959)] (12.4 g., 29.8 mmole) is deacetylated in 350 cc. of 1 N methanolic sodium methoxide solution under nitrogen at room temperature for 45 minutes. After neutralization with 1.5 cc. of glacial acetic acid, the mixture is evaporated and the residue distributed between chloroform and water. The chloroform phase is dried and evaporated to give a crystalline residue [deoxycorticosterone 20-ethylene ketal (20-ethylenedioxy-21-hydroxy-4-pregnen-3-one)] which is recrystallized from ether-hexane; 10.08 g. (90%), melting point 156–158° C. A sample recrystallized twice from ether shows melting point 163–165°; $[\alpha]_D^{25}+100°$ (c. 1.30 in CHCl₃);

$\lambda_{max.}^{KBr}$ 6.02μ (s.); $\lambda_{max.}^{MeOH}$ 242 mμ (ε 16,840)

A mixture of 1.87 g. (5 mmole) of deoxycorticosterone 20-ethylene ketal, 2 cc. of ethyl formate, 1 g. of sodium hydride-oil suspension and 100 cc. of benzene is stirred under nitrogen for 16 hours. Reaction is started by the addition of a few drops of ethanol. The mixture is worked up by extraction with water and neutralization with sodium dihydrogen phosphate as described in Example II. There is obtained a crystalline solid which is recrystallized from methylene chloride-ether to give 1.27 g. (60%) of a light yellow product with melting point 184–190° C. The analytical sample is recrystallized from a large volume of ether; melting point 191–192° C. positive enol test; $[\alpha]_D^{25}+41.2°$ (c. 1.12 in CHCl₃);

$\lambda_{max.}^{KBr}$ 6.07μ (s.) broad band, 6.36μ (m.); $\lambda_{max.}^{MeOH}$ 252 mμ (ε 11,880) and 307 mμ (ε 3625) in acid, 252 mμ (ε 11,880) and 306 mμ (5230) in methanol, 244 mμ (ε 14,500) and 357 mμ (ε 11,070) in base

EXAMPLE V

2-Hydroxymethylenedeoxycorticosterone (21-Hydroxy-2-Hydroxymethylene-4-Pregnene-3,20-Dione)

To a solution of 1.36 g. (3.38 mmole) of 2-hydroxymethylenedeoxycorticosterone 20-ethylene ketal in 175 cc. of acetone is added 340 mg. of p-toluene-sulfonic acid and the mixture is stirred at room temperature for 22 hours. After neutralization with a few drops of pyridine, the mixture is evaporated at room temperature and the residue is dissolved in methylene chloride, washed several times with water, dried and evaporated. The residue is triturated with ether to yield 959 mg. (79%) of product with melting point 162–168°. Recrystallization from methylene chloride-ether gives material with melting point 167–172°.

EXAMPLE VI

2-Hydroxymethylenehydrocortisone 20-Ethylene Ketal (20 - Ethylenedioxy - 2 - Hydroxymethylene - 11β,17α, 21-Trihydroxy-4-Pregnen-3-One)

Sodium (276 mg. 12 mmoles) is dissolved in 50 cc. of absolute methanol and the solvent is removed under reduced pressure in a 100° C. bath. To the residual sodium methoxide is added 25 cc. of dry benzene, 18 cc. of purified ethyl formate and 1.2 g. (2.95 mmole) of hydrocortisone 20-ethylene ketal (20-ethylenedioxy-11β, 17α,21-trihydroxy-4-pregnen-3-one) [H. M. Kissman et al., J. Am. Chem. Soc., 82, 2312 (1960)]. The mixture is stirred at room temperature under nitrogen for 18 hours. Chloroform and cold 30% aqueous sodium dihydrogen phosphate solution is added and the layers are separated. The aqueous phase is extracted several times with chloroform and the combined extracts are washed with water, dried and evaporated. The residue is dissolved in methylene chloride and the solution is extracted with portions of cold 1% potassium hydroxide solution until these extracts no longer give a positive ferric chloride test. The combined extracts are neutralized with sodium dihydrogen phosphate solution and the mixture is extracted with methylene chloride. These methylene chloride extracts are combined, washed with a little water, dried and evaporated to give 830 mg. of yellow glass. Crystallization from hot ethyl acetate gives 462 mg. (37%) with melting point 224–231° C. A sample is recrystallized several times from this solvent; melting point 233–236° C.; $[\alpha]_D^{25}+47.10$ (c., 0.66 in $CHCl_3$);

$\lambda_{max.}^{KBr}$ 6.06$\mu$ (s.), 6.21$\mu$ (m.) shoulder; $\lambda_{max.}^{MeOH}$ 252 m$\mu$ ($\epsilon$ 13,600) and 307 m$\mu$ ($\epsilon$ 2810) in acid, 250 m$\mu$ ($\epsilon$ 12,200) and 308 m$\mu$ ($\epsilon$ 4460) in methanol, 247 m$\mu$ ($\epsilon$ 13,892) and 356 m$\mu$ ($\epsilon$ 11,400) in base

EXAMPLE VII

*17α,20:20,21-Bismethylenedioxy-2-Hydroxymethylene-4-Pregnene-3-11-Dione*

A mixture of 4.02 g. (10 mole) of 17α,20:20,21-bismethylenedioxy-4-pregnene-3,11-dione [R. E. Beyler et al., J. Amer. Chem. Soc., 82, 178 (1960)], 2.0 g. of sodium hydride-oil suspension, 4 cc. of ethyl formate and 200 cc. of dry benzene is stirred under nitrogen for 16 hours and is then worked up as described in Example II. There is obtained a crude residue which is crystallized from methylene chloride-ether to give a light yellow solid, 3.46 g. (81%) melting point 205–211° C. For analysis, material obtained in a similar experiment is recrystallized from the same solvent mixture; melting point 206–209° C.; $[a]_D^{25}+9.2°$ C. (c., 0.875 in $CHCl_3$);

$\lambda_{max.}^{KBr}$ 5.89$\mu$ (s.), 6.06$\mu$ (s.), 6.29$\mu$ (m.); $\lambda_{max.}^{MeOH}$ 248 m$\mu$ (10,980) and 305 m$\mu$ ($\epsilon$ 3830) in acid, 248 m$\mu$ ($\epsilon$ 9920) and 305 m$\mu$ ($\epsilon$ 4950) in methanol, 243 m$\mu$ ($\epsilon$ 12,660) and 362 m$\mu$ ($\epsilon$ 12,000) in base

EXAMPLE VIII

*9α - Fluoro - 11β-Hydroxy-2-Hydroxymethylene-16α,17α-Isopropylidenedioxy - 21 - (Tetrahydropyran-2-Yloxy)-4-Pregnene-3,20-Dione*

A solution of 0.5 g. of 11β,21-dihydroxy-9α-fluoro-16α,17α-isopropylidenedioxyprogesterone [J. Amer. Chem. Soc., 80, 2338 (1958)] in 20 cc. of dihydropyran is cooled to 0° C. There is added with stirring dropwise 1 cc. of concentrated hydrochloric acid at a rate slow enough to keep the internal temperature between 10–20°. The mixture is then stirred at room temperature for one hour. Hexane (100 cc.) is added and the mixture is cooled in the refrigerator overnight. The solid which precipitates out during this time is collected by filtration and is washed thoroughly with hexane and is air dried. The substance is recrystallized from ethyl acetate to give 0.4 g. of 9α-fluoro-11β-hydroxy-16α,17α-isopropylidenedioxy - 21 - (tetrahydropyran - 2-yloxy)-4-pregnene-3,20-dione with melting point 200–205° C.;

$\lambda_{max.}^{KBr}$ 5.80$\mu$ and 5.96$\mu$ (carbonyl region)

A mixture of 2.6 g. (5 mmole) of 9α-fluoro-11β-hydroxy-16α,17α-isopropylidenedioxy-21-(tetrahydropyran-2-yloxy)-4-pregnene-3,20-dione, 2 cc. of ethyl formate, 1 g. of sodium hydride-oil suspension and 100 cc. of dry benzene is stirred under nitrogen. The reaction is started with the addition of a few drops of absolute ethanol and stirring is continued for 23 hours. Ether (100 cc.) is added to the mixture which is then extracted with several portions of water. The organic phase is dried and evaporated to give 0.97 g. of starting material. The dark-yellow water extracts are neutralized through the addition of 30% aqueous sodium dihydrogen phosphate solution. The mixture is extracted with several portions of chloroform and the combined extracts are dried and evaporated to give 1.13 g. (66% yield corrected for recovered starting material) of yellow glass. This material is crystallized partially from ether to give 460 mg. (26.8%, corrected for recovered starting material) of bright yellow solid with melting point 120–128°. For analysis, the material is recrystallized from ether; melting point 125–128°; $[\alpha]_D^{25}+68.5°$ (c., 1.02 in $CHCl_3$);

$\lambda_{max.}^{KBr}$ 5.78$\mu$ (s.), 6.07$\mu$ (s.) broad band, 6.32$\mu$ (m.); $\lambda_{max.}^{MeOH}$ 246 m$\mu$ ($\epsilon$ 13,900) and 305 m$\mu$ ($\epsilon$ 2470) in acid, 248 m$\mu$ ($\epsilon$ 12,500) and 307 m$\mu$ ($\epsilon$ 4180) in methanol, 242 m$\mu$ ($\epsilon$ 14,900) and 358 m$\mu$ ($\epsilon$ 9600) in base The gum from the mother liquors gives a positive enol test and can also be converted to the corresponding 2α-cyano-9α-fluoro-11β,21-dihydroxy-16α,17α-isopropylidenedioxy-4-pregnene-3,20-dione.

EXAMPLE IX

*9α - Fluoro - 11β,21-Dihydroxy-2-Hydroxymethylene-16α,17α-Isopropylidenedioxy-4-Pregnene-3,20-Dione*

A solution of 9α-fluoro-11β-hydroxy-2-hydroxymethylene - 16α,17α - isopropylidenedioxy-21(tetrahydropyran-2-yloxy)-4-pregnene-3,20-dione (300 mg.) in 30 cc. of 60% acetic acid is stirred at room temperature for 30 minutes and is then evaporated to room temperature. The residue is dissolved in methylene chloride-water and the organic phase is washed with a little water and is dried over magnesium sulfate, filtered and evaporated. The residue is crystallized from ether to give 159 mg., melting point 220–227°; positive ferric chloride and blue tetrazolium tests. Recrystallization from methylene chloride-ether raises the melting point to 228–232°.

EXAMPLE X

*2α-Cyanotestosterone 17-Trifluoroacetate (2α-Cyano-17β-Trifluoroacetoxy-4-Androsten-3-One)*

A solution of 1.28 g. (4.05 mmoles) of 2-hydroxymethylene-17β-hydroxy-4-androsten-3-one [Weisenborn et al., J. Amer. Chem. Soc., 76, 552 (1959)] and 1.82 g. (8.1 mmoles) of O,N-bis-trifluoroacetyl)-hydroxylamine in 50 cc. of benzene and 2.42 cc. of pyridine is allowed to reflux with stirring for two hours. The cooled solution is washed with two 10 cc. portions of water and the benzene phase is dried and evaporated. The residue is triturated with ether to give 1.16 g. (70%) of a crystalline solid with melting point 212–216° C. Recrystallization from methylene chloride-ether gives a sample with melting point 212–217° C.; $[\alpha]_D^{25}+83.3°$ (c., 0.91 in $CHCl_3$);

$\lambda_{max.}^{KBr}$ 4.43$\mu$ (w.), 5.61$\mu$ (s.), 5.91$\mu$ (s.), 6.15$\mu$ (w.); $\lambda_{max.}^{MeOH}$ 249 m$\mu$ ($\epsilon$ 14,720) in acid, 242 m$\mu$ ($\epsilon$ 16,400) in methanol, 330 m$\mu$ ($\epsilon$ 6250) in base The conversion of 2-hydroxymethylene-17β-hydroxy-4-androsten-3-one to the 2α-cyanotestosterone trifluoroacetate (2α-cyano-17β-trifluoroacetyl-4-androsten-3-one) can be carried out by stirring the reactants at room temperature for 24 hours. After the usual workup, the desired compound is isolated in 57% yield.

EXAMPLE XI

*2α-Cyanotestosterone (2α-Cyano-17β-Hydroxy-4-Androsten-3-One)*

A suspension of 124 mg. (0.3 mmole) of the product of Example X (2α-cyanotestosterone 17-trifluoroacetate) in 5 cc. of methanol containing 0.6 cc. of 10% aqueous potassium carbonate solution is stirred under nitrogen for three hours. Most of the original solid goes into solution during this period and another solid precipitates out. After neutralization with a few drops of acetic acid, the mixture is evaporated. The residue is distributed between water and methylene chloride and the organic phase is washed with a little water and is dried and evaporated. The yellow residue is decolorized with activated charcoal in ether and is then crystallized and recrystallized from ether-hexane; 61 mg. (64%); melting point 155–156°; $[\alpha]_D^{25}+119°$; (c., 0.54 in CHCl$_3$);

$\lambda_{max}^{KBr}$ 2.82μ (m.), 4.43μ (w.), 5.91μ (s.) broad peak, 6.16μ (m.); $\lambda_{max}^{MeOH}$ 248 mμ (ε 17,970) in acid, 242 mμ (ε 15,600 in methanol, 332 mμ (ε 6710) in base

EXAMPLE XII

2α Cyanotestosterone Acetate

To a chilled solution of 313 mg. (1 mmole) of 2α-cyanotestosterone (Example XI) in 5 cc. of pyridine is added 1 cc. of acetic anhydride and the mixture is stirred in an ice bath for one hour at room temperature for 16 hours. It is then added dropwise with stirring to 100 cc. of ice water and the solid which precipitates is collected, washed well with water and is dissolved in 35 cc. of chloroform. The solution is washed once with water and is dried over magnesium sulfate, filtered and evaporated under reduced pressure. The residue (360 mg.) is dissolved in 10 cc. of methanol and is stirred at room temperature for five minutes with 0.05 ml. of 10% aqueous sodium hydroxide solution. The yellow mixture is neutralized with a few drops of acetic acid and is evaporated under reduced pressure at room temperature. The residue is partitioned between water and methylene chloride and the organic phase is washed once with water, dried over magnesium sulfate and evaporated under reduced pressure. The residue is crystallized and recrystallized from ether to give 218 mg. of 2α-cyanotestosterone acetate.

EXAMPLE XIII

2α-Cyanotestosterone Propionate

In the same manner, but using propionic anhydride and crystallizing from acetone-hexane, there is obtained from 313 mg. (1 mmole) of 2α-cyanotestosterone 277 mg. of 2α-cyanotestosterone propionate.

EXAMPLE XIV

2α-Cyano-20-Ethylenedioxy-4-Pregnen-3-One

The reaction of 386 mg. (1 mmole) of 20-ethylenedioxy-2-hydroxymethylene-4-pregnen-3-one, prepared in Example II, with 225 mg. (1 mmole) of O,N-bis-(trifluoroacetyl)-hydroxylamine in 10 cc. of benzene and 0.3 cc. of pyridine is carried out as described in Example X. The crystalline residue is collected and washed with ether, 290 mg. (76%), melting point 258–260° C. $[\alpha]_D^{25}+115°$ (c., 0.97 in CHCl$_3$);

$\lambda_{max}^{KBr}$ 4.43μ (w.), 5.89μ (s.), 6.14μ (m.); $\lambda_{max}^{MeOH}$ 249 mμ (ε 17,200) in acid, 242 mμ (ε 17,270) in methanol, 330 mμ (ε 6440) in base

EXAMPLE XV

2α-Cyanoprogesterone (2α-Cyano-4-Pregnene-3,20-Dione)

Crude 2α-cyano-20-ethylenedioxy-4-pregnen-3-one is prepared from 700 mg. (1.83 mmoles) of 20-ethylenedioxy-2-hydroxymethylene-4-pregnen-3-one as described in Example XIV. The crystalline product is dissolved partially without drying in 10 cc. of water, 10 cc. of acetic acid and 3 cc. of ethanol. The mixture is heated on the steam bath for one hour and is then evaporated. The residue is dissolved in methylene chloride and water and the organic phase is dried and evaporated. The residue is crystallized with ether and recrystallized (with activated charcoal) from methylene chloride-ether, 331 mg. (54% over-all from starting material), melting point 191–195° C. For analysis, the material is recrystallized with activated charcoal from a large volume of ether to give material with melting point 193–195° (some earlier sintering); $[\alpha]_D^{25}+212°$ (c., 0.95 in CHCl$_3$);

$\lambda_{max}^{KBr}$ 4.44μ (s.); 5.89–5.94μ (s.), 6.14μ (m.), no absorption at 9.5μ (ketal region); $\lambda_{max}^{MeOH}$ 250 mμ (ε 16,300) in acid, 242 mμ (ε 16,300) in methanol, 330 mμ (ε 6450) in base

EXAMPLE XVI

Conversion of 2-Hydroxymethyleneprogesterone to 2α-Cyanoprogesterone

A solution of 342 mg. (1 mmole) of 2-hydroxymethyleneprogesterone (Example III) in 15 cc. of dry benzene is stirred under reflux with 225 mg. (1 mmole) of O,N-bis-(trifluoroacetyl)-hydroxylamine and 0.3 cc. of pyridine for two hours. The yellow solution is cooled, diluted with 15 cc. of benzene and is then washed with several portions of water. The dried solution (magnesium sulfate) is freed from solvent under reduced pressure and the residue is crystallized with ether and collected by filtration. The solid is recrystallized from methylene chloride-ether to give 186 mg. (55%) of material with melting point 190–195°.

EXAMPLE XVII

2α-Cyanodeoxycorticosterone (2α-Cyano-21-Hydroxy-4-Pregnen-3,20-Dione)

The reaction of 2-hydroxymethylenedeoxycorticosterone 20-ethylene ketal (Example IV) (402 mg., 1 mmole) with 450 mg. (2 mmoles) of O,N-bis-(trifluoroacetyl)-hydroxylamine and 0.7 cc. of pyridine in 15 cc. of benzene is carried out as described in Example X. The product, 2α-cyano-20-ethylenedioxy-21-trifluoroacetoxy-4-pregnen-3-one, is isolated as a glass (470 mg.) and is crystallized from methanol. It is dissolved with warming in 20 cc. of methanol, aqueous potassium carbonate solution (10%, 1 cc.) is added and the mixture is stirred under nitrogen for one hour. There is then added 20 cc. of methanol and 1 cc. of 8% aqueous sulfuric acid and the mixture is heated under reflux for one hour. The acid is neutralized by stirring with an anion exchange resin (OH form) and the solution obtained after filtration and washing of the resin with methanol is evaporated. The residue is dissolved in ethyl acetate and water and the organic phase is separated, washed with a little water, dried and evaporated. The residue is crystallized from methylene chloride-ether, 184 mg. (52%) melting point 174–176° C. The analytical sample is recrystallized from a large volume of ether with activated charcoal; melting point 183–184° C.; $[\alpha]_D^{25}+175°$ (c., 0.84, in EtOH), $+208°$ (c., 0.41);

$\lambda_{max}^{KBr}$ 2.86μ (m.), 4.43μ (w.), 5.85–5.95μ (s.), 6.16μ (m.); $\lambda_{max}^{MeOH}$ 248 mμ (ε 15,200) in acid, 242 mμ (ε 15,280) in methanol, 334 mμ (ε 3325) in base

EXAMPLE XVIII

2α-Cyanodeoxycorticosterone 21-Propionate

To a chilled solution of 395 mg. (1 mmole) of 2α-cyanodeoxycorticosterone (Example XVII) in 5 cc. of dry pyridine is added 1.2 cc. of propionic anhydride and the mixture is stirred in an ice bath for 30 minutes and at room temperature overnight. The solution is then added slowly to 100 cc. of ice water and the resulting mixture is extracted with several portions of chloroform. The total extracts are washed with water and are dried over magnesium sulfate, filtered and evaporated under reduced pressure. The residue is dissolved in 10 cc. of methanol and the solution is stirred with 0.05 cc. of 10% aqueous sodium hydroxide solution for three minutes and is then neutralized with acetic acid. The solution is evaporated and the residue is partitioned between methylene chloride and water. The organic phase is washed with water, dried over magnesium sulfate, and evaporated under reduced pressure. The partially crystalline residue is collected with a small amount of ether and is recrystallized from acetone-hexane to give 206 mg. of 2α-cyanodeoxycorticosterone 21-propionate, $\lambda_{max.}^{KBr}$ 4.42μ, 5.80μ, 5.95μ, 810μ.

EXAMPLE XIX

2α-Cyanodeoxycorticosterone 21-Acetate

In the same manner but using 1 cc. of acetic anhydride there is obtained from 200 mg. 2α-cyanodeoxycorticosterone (Example XVII) 118 mg. of 2α-cyanodeoxycorticosterone 21-acetate.

EXAMPLE XX

Conversion of 2-Hydroxymethylenedeoxycorticosterone to 2α-Cyanodeoxycorticosterone A solution of 358 mg. (1 mmole) of 2-hydroxy-methylenedeoxycorticosterone (Example V) 450 mg. of (2 mmole) of O,N-bis-(trifluoroacetyl)-hydroxylamine and 0.7 cc. of pyridine in 15 cc. of dry benzene is allowed to reflux for two hours and is then diluted with 25 cc. of benzene. The solution is washed with several portions of water, dried over magnesium sulfate and evaporated under reduced pressure. The residue is collected with ether and is dissolved in 15 cc. of methanol. Aqueous potassium carbonate solution (10%) is added to the mixture, which is stirred under nitrogen for one hour and is then neutralized with a few drops of acetic acid. The mixture is evaporated under reduced pressure and the residue is mixed with water and methylene chloride. The organic phase is separated, washed with a little water and is dried over magnesium sulfate, filtered and evaporated under reduced pressure. The residue is collected with ether and is recrystallized from a small amount of ethyl acetate to give 103 mg. (33%), melting point 176–180°.

EXAMPLE XXI

2α-Cyano-20-Ethylenedioxy-11β,17α-Dihydroxy-21-Trifluoroacetyl-4-Pregnen-3-One The reaction of 250 mg. (0.5 mmole) of 2-hydroxymethylenehydrocortisone 20-ethylene ketal (Example VI) with 225 mg. (1 mmole) of O,N-bis-(trifluoroacetyl)-hydroxylamine and 0.3 cc. of pyridine in 10 cc. of benzene is carried out as described in Example X. The product is crystallized from ether-hexane to give 87 mg. (30%) with melting point 197–207° C. A sample recrystallized from ether with activated charcoal shows melting point 225–277°; $[\alpha]_D^{25}$+92.2° (c., 0.93 in CHCl₃);

$\lambda_{max.}^{KBr}$ 2.82μ (m.), 4.44μ (w.), 5.57μ (s.), 5.91μ (s.) broad peak, 6.15μ (m.); $\lambda_{max.}^{MeOH}$ 248 mμ (ε 16,100) in acid, 242 mμ (ε 15,300) in methanol, 331 mμ (ε 6320) in base

EXAMPLE XXII

2α-Cyanohydrocortisone (2α-Cyano-11β,17α,21-Trihydroxy-4-Pregnene-3,20-Dione The compound prepared in Example XXI (200 mg., 0.38 mmole) in 7 cc. of methanol and 0.7 cc. of a 10% aqueous potassium carbonate solution is stirred under nitrogen for one hour. There is then added 18 cc. of methanol and 1 cc. of an 8% aqueous sulfuric acid solution and the mixture is heated under reflux with stirring for one hour. After neutralization with an anion exchange resin (OH form), the filtrate and washings are evaporated. The residue is dissolved in a mixture of ethyl acetate and water and the water layer is washed with several portions of ethyl acetate. The combined organic layers are washed with a little water, dried and evaporated to give a residue which is crystallized from a small amount of hot ethyl acetate; 72 mg. (49%), melting point 220–222° C. A sample recrystallized twice from ethyl acetate with activated charcoal shows melting point 235–237°; $[\alpha]_D^{25}$+172° (c., 0.262 in methanol);

$\lambda_{max.}^{KBr}$ 2.90μ (s.) broad peak, 4.45μ (w.), 5.84μ (m.), 5.95μ (s.), 6.17μ (m.); $\lambda_{max.}^{MeOH}$ 249 mμ (ε 14,900) in acid, 243 mμ (ε 14,330) in methanol, 330 mμ (ε 5035) in base

EXAMPLE XXIII

2α-Cyanohydrocortisone 21-Acetate

Acetic anhydride (1 cc.) is added to a chilled solution of 329 mg. (1 mmole) of 2α-cyanohydrocortisone (Example XXII) in 5 cc. of dry pyridine and the mixture is kept at room temperature for 16 hours. The solution is then added dropwise with stirring to 100 cc. of ice water and the solid which separates is collected, washed with water and dissolved in chloroform. The solution is dried over magnesium sulfate, filtered and evaporated under reduced pressure to leave a residue which is crystallized from ether to give 354 mg. of a white substance, melting point 215–224°. This material (125 mg.) is dissolved in 8 cc. of methanol and solution is stirred for five minutes at room temperature with 0.05 cc. of 10% aqueous sodium hydroxide solution and is then neutralized with a few drops of acetic acid. The mixture is evaporated under reduced pressure and the residue is dissolved in chloroform and water. The organic phase is dried with magnesium sulfate, filtered and evaporated under reduced pressure. The residue is crystallized from ether to give 88 mg. of product which, after two recrystallizations from methylene chloride-ether, shows melting point 233–238°.

EXAMPLE XXIV

17α,20;20,21-Bismethylenedioxy-2α-Cyano-4-Pregnene-3,11-Dione

A mixture of 430 mg. (1 mmole) of 2-hydroxymethylene - 17α,20;20,21 - bismethylenedioxy-4-pregnene-3,11-dione (Example VII) and 225 mg. (1 mmole) of O,N-bis-(trifluoroacetyl)-hydroxylamine is heated in 10 cc. of benzene and 0.3 cc. of pyridine for one hour. The mixture which becomes quite dark during this period is diluted with 10 cc. of benzene and is washed with several small portions of water. Evaporation of the dried benzene phase left a dark gum which is purified by solution in acetone-hexane and decantation from a black oil. Treatment of the supernatant with activated charcoal and partial evaporation with the addition of hexane gives a white crystalline product, 107 mg. (25%), melting point 223–228° C. Several recrystallizations from ether-methylene chloride gives an analytical sample with melting point 232–233°; $[\alpha]_D^{25}$+91.2° (c., 0.428 in CHCl₃);

$\lambda_{max.}^{KBr}$ 4.42μ (w.), 5.80μ (s.), 5.94μ (s.), 6.15μ (m.); $\lambda_{max.}^{MeOH}$ 243 mμ (ε 15,900) in acid, 238 mμ (ε 14,350) in methanol, 332 mμ (ε 6200) in base

EXAMPLE XXV

2α-Cyanocortisone (2α-Cyano-17α,21-Dihydroxy-4-Pregnene-3,11,20-Trione)

17α,20;20,21-bismethylenedioxy-2α-cyano-4-pregnene-3,11-dione, 120 mg. (0.28 mmole) is heated with 5 cc. of 60% formic acid on the steam bath for 30 minutes. The solution is evaporated and water is added to the residue. The suspension is extracted with several portions of ethyl acetate and the combined extracts are dried and evaporated. The residue is crystallized from ethyl acetate, 53 mg. (50%), melting point 240–243° C. The recrystallizations from that solvent with activated charcoal gives a sample with melting point 246–247°; $[\alpha]_D^{25}$+194° (c., 0.638 dioxane);

$\lambda_{max.}^{KBr}$ 2.86μ (m.), 4.45μ (w.), 5.90μ (s.) broad peak, 6.15μ (m.); $\lambda_{max.}^{MeOH}$ 242 mμ (ε 18,500) in acid, 235 mμ (ε 18,500) in methanol, 331 mμ (ε 4930) in base

EXAMPLE XXVI

2α-Cyanocortisone 21-Propionate

To a stirred, chilled solution of 385 mg. (1 mmole) of 2α-cyanocortisone (Example XXV) in 5 cc. of dry pyridine is added 1.2 cc. of propionic anhydride. The yellow solution is stirred at room temperature for 16 hours and is then added dropwise to 60 cc. of ice water.

The light yellow precipitate which forms is collected, dissolved in chloroform and the solution is washed with a little water, dried and partially decolorized over magnesium sulfate and activated charcoal, filtered and evaporated under reduced pressure. The crystalline residue is redissolved in 10 cc. of methanol and the solution is stirred for a few minutes with 0.05 cc. of 8% acqueous potassium hydroxide solution. The mixture is then neutralized with a few drops of acetic acid and is evaporated under reduced pressure. The residue is partitioned between methylene chloride and water and the organic phase is washed with a small amount of water, dried over magnesium sulfate, filtered and evaporated under reduced pressure. The solid residue is recrystallized from acetone-hexane to yield 311 mg. of product.

EXAMPLE XXVII $2\alpha$-Cyano-$9\alpha$-Fluoro-$11\beta,21$-Dihydroxy-$16\alpha,17\alpha$-Isopropylidenedioxy-4-Pregnene-3,20-Dione The reaction of $9\alpha$-fluoro-$11\beta$-hydroxy-2-hydroxymethylene-$16\alpha,17\alpha$-isopropylidenedioxy-21-(tetrahydropyran-2-yloxy)-4-pregnene-3,20-dione (Example VIII) (274 mg., 0.5 mmole) with 225 mg. (1 mmole) of O,N-bis-(trifluoroacetyl)-hydroxylamine and 0.4 cc. of pyridine in 10 cc. of benzene is carried out as described in Example X. The product, [$2\alpha$-cyano-$9\alpha$-fluoro-$11\beta$-hydroxy-$16\alpha,17\alpha$-isopropylidenedioxy-21-(tetrahydropyran-2-yloxy)-4-pregnene-3,20-dione], (300 mg.) from this reaction is dissolved in 20 cc. of methanol containing 1 cc. of 8% aqueous sulfuric acid and the solution is stirred at room temperature for one hour. The mixture is neutralized by stirring with an anion exchange resin (OH form) and the filtrate and washings are evaporated. The residue is crystallized from methanol with activated charcoal to give 124 mg. (54%) with melting point 285–290° (dec.). A sample is recrystallized from acetone-hexane; melting point 293–296° C. (dec.); $[\alpha]_D^{25}+132°$ (c., 0.58 in acetone);

$\lambda_{max.}^{KBr}$ 2.98$\mu$ (m.), 4.44$\mu$ (w.), 5.82$\mu$ (s.), 5.91$\mu$ (s.), 6.13$\mu$ (m.); $\lambda_{max.}^{MeOH}$ 244 m$\mu$ ($\epsilon$ 17,750) in acid, 238 m$\mu$ ($\epsilon$ 17,300) in methanol, 333 m$\mu$ ($\epsilon$ 5990) in base The base soluble (+FeCl$_3$ test) gum from the mother liquors of the 2-hydroxymethylene derivative prepared in Example VIII when taken through this reaction sequence gives a 27% yield of the desired crystalline $2\alpha$-cyano compound.

EXAMPLE XXVIII $2\alpha$-Cyano-$9\alpha$-Fluoro-$11\beta,21$-Dihydroxy-$16\alpha,17\alpha$-Isopropylidenedioxy-4-Pregnene-3,20-Dione 21-Acetate To a chilled, stirred solution of 230 mg. (0.05 mmole) of $2\alpha$-cyano-$9\alpha$-fluoro - $11\beta,21$ - hydroxy-$16\alpha,17\alpha$-isopropylidenedioxy-4-pregnene-3,20-dione (Example XXVII) in 4 cc. of dry pyridine is added 0.6 cc. of acetic anhydride. The solution is stored at room temperature for 16 hours and is then added to 35 cc. of water. The mixture is extracted with several portions of chloroform and the total extracts are washed with water, dried over magnesium sulfate and evaporated under reduced pressure. The residue is redissolved in 8 cc. of methanol and 0.03 cc. of 10% sodium hydroxide in water is added. The mixture is shaken manually for a few minutes and is then neutralized with a few drops of acetic acid and is evaporated under reduced pressure. The residue is distributed between chloroform and water and the chloroform phase is dried over magnesium sulfate, filtered and evaporated under reduced pressure to leave a crystalline residue which is recrystallized from methylene chloride-ether to yield 176 mg. of product showing $\lambda_{max.}^{KBr}$ 2.99$\mu$, 4.44$\mu$ (w.), 5.79$\mu$ (s.), 5.95$\mu$ (s.), 6.13$\mu$ (w.), 8.10$\mu$ (s.); $\lambda_{max.}^{MeOH}$ 239 m$\mu$ ($\epsilon$ 17,700); 335 m$\mu$ ($\epsilon$ 5970) in base

EXAMPLE XXIX

Conversion of $9\alpha$-Fluoro-$11\beta,21$-Dihydroxy-2-Hydroxymethylene - $16\alpha,17\alpha$ - Isopropylidenedioxy-4-Pregnene-3,20-Dione to $2\alpha$-Cyano-$9\alpha$-Fluoro-$11\beta,21$-Dihydroxy-$16\alpha,17\alpha$-Isopropylidenedioxy-4-Pregnene-3,20-Dione A solution of 464 mg. (1 mmole) of $9\alpha$-fluoro-$11\beta,21$-dihydroxy-2-hydroxymethylene - $16\alpha,17\alpha$ - isopropylidenedioxy-4-pregnene-3,20-dione (Example IX), 450 mg. (2 mmole) of O,N-bis-(trifluoroacetyl)-hydroxylamine and 0.7 cc. of pyridine in 15 cc. of benzene is allowed to reflux for two hours. The cooled solution is diluted with 25 cc. of benzene and is washed with water, dried over magnesium sulfates, filtered and evaporated under reduced pressure. The residue is dissolved in 15 cc. of methanol and is treated under nitrogen with 1 cc. of 10% aqueous potassium carbonate solution for one hour at room temperature. The solution is neutralized with acetic acid and is evaporated under reduced pressure. The residue is dissolved in methylene chloride and water and the organic phase is washed with water, dried over magnesium sulfate and evaporated under reduced pressure. The residue is recrystallized from acetone-hexane to give 188 mg. (41% with melting point 290-295° (dec.).

EXAMPLE XXX

2-Cyano-1,4-Pregnadiene-3,20-Dione

A solution of 170 mg. (0.5 mmole) of $2\alpha$-cyanoprogesterone (Example XVI) and 171 mg. of 2,3-dichloro-5,6-dicyanobenzoquinone [J. Chem. Soc. 3569 (1954)] in 25 cc. of purified dioxane is allowed to reflux for 18 hours. The mixture is then evaporated under reduced pressure and the residue is mixed with 40 cc. of benzene and filtered. The benzene solution is washed several times with water and is then dried and partially decolorized with magnesium sulfate and activated charcoal. The filtered solution is evaporated under reduced pressure and the residue is crystallized with ether to give 141 mg. (84%) with melting point 222-224°

$\lambda_{max.}^{MeOH}$ 253 m$\mu$ $\lambda_{max.}^{KBr}$ 4.41$\mu$ (CN), 5.81$\mu$ (20-ketone), 5.95$\mu$ (3-ketone), 6.10$\mu$ and 6.20$\mu$ (C=C)

EXAMPLE XXXI

2-Cyano-$17\beta$-Trifluoroacetoxy-1,4-Androstadien-3-One

A solution of 409 mg. (1 mmole) of $2\alpha$-cyano-testosterone trifluoroacetate (Example X) in 40 cc. of purified dioxane is refluxed with 342 mg. of 2,3-dichloro-5,6-dicyanobenzoquinone for 16 hours. The cooled solution is evaporated and the residue is taken up in 30 cc. of benzene and filtered. The benzene solution is washed with several portions of water and is dried over magnesium sulfate. The filtered solution is freed from solvent under reduced pressure and the residue is crystallized from ether to give 327 mg., melting point 255-257°; $[\alpha]_D^{25}$—24.7° (c., 1.33 in CHCl$_3$);

$\lambda_{max.}^{KBr}$ 4.49$\mu$, 5.62$\mu$, 5.95$\mu$, 6.02$\mu$ (w.), 6.12$\mu$ (w.), 6.23$\mu$ (w.); $\lambda_{max.}^{MeOH}$ 245 m$\mu$ ($\epsilon$ 10,987)

We claim:
1. The compound $2\alpha$-cyanotestosterone trifluoroacetate.
2. The compound $2\alpha$-cyanotestosterone.
3. The compound $2\alpha$-cyano-20-ethylenedioxy-4-pregnen-3-one.
4. The compound $2\alpha$-cyanodeoxycorticosterone.
5. The compound $2\alpha$-cyano-20-ethylenedioxy-$11\beta,17\alpha$-dihydroxy-21-trifluoroacetoxy-4-pregnen-3-one.
6. The compound $2\alpha$-cyanohydrocortisone.
7. The compound $2\alpha$-cyano-$17\alpha$,20,20,21-bismethylenedioxy-4-pregnene-3,11-dione.
8. The compound $2\alpha$-cyanocortisone.
9. The compound $2\alpha$ - cyano - $9\alpha$ - fluoro-$11\beta,21$-dihydroxy-$16\alpha,17\alpha$ - isopropylidenedioxy - 4 - pregnene - 3,20-dione.

10. The compound 2α-cyanoprogesterone.

11. The compound 2-cyano-1,4-pregnadiene-3,20-dione.

12. The compound 2-cyano-17β-hydroxy-1,4-androstadien-3-one.

13. The compound 2-hydroxymethylene-17α,20;20,21,bismethylenedioxy-4-pregnene-3,11-dione.

14. The compound 9α-fluoro-11β-hydroxy-2-hydroxymethylene - 16α,17α-isopropylidenedioxy-21-(tetrahydropyran-2-yloxy)-4-pregnene-3,20-dione.

15. The compound 9α-fluoro-11β,21-dihydroxy-2-hydroxymethylene-16α,17α-isopropylidenedioxy-4-pregnene-3,20-dione.

16. A process of preparing 2α-cyanoΔ⁴-3-ketosteroids which comprises treating a Δ⁴-3-ketosteroid having in the 2-position a radical selected from the group consisting of formyl and tautomeric forms of formyl radicals with O,N-bis-trifluoroacetylhydroxylamine and recovering said compound therefrom.

17. A compound selected from those having the formula:

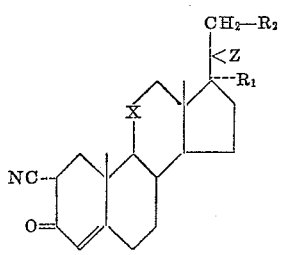

wherein $R_1$ is a member of the group consisting of hydrogen and hydroxyl radicals, $R_2$ is a member of the group consisting of hydrogen, hydroxy, lower alkanoyloxy and trifluoroacetoxy radicals, Z is a member of the group consisting of oxygen and ethylenedioxy radicals and X is a member of the group consisting of

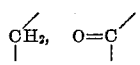

and

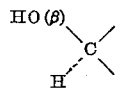

groups and the corresponding 1,2-double bonded derivatives.

18. A compound selected from those having the formula:

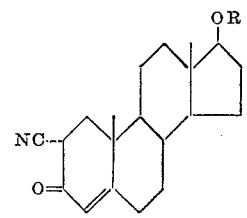

wherein R is a member of the group consisting of hydrogen, lower alkanoyl and trifluoroacetyl radicals and the corresponding 1,2-double bonded derivatives.

19. A compound of the formula:

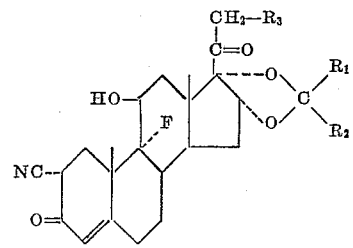

wherein $R_1$ and $R_2$ are lower alkyl and $R_3$ is a member of the group consisting of hydrogen, hydroxyl, lower alkanoyloxy and trifluoroacetoxy radicals.

References Cited in the file of this patent
UNITED STATES PATENTS 2,947,762   Ringold et al. _____ Aug. 2, 1960